(12) United States Patent
Wright (10) Patent No.: US 11,989,297 B2
(45) Date of Patent: May 21, 2024

(54) APPARATUS, METHOD AND COMPUTER PROGRAM FOR DETECTING MALWARE

(71) Applicant: Nokia Technologies Oy, Espoo (FI)

(72) Inventor: Christopher Wright, London (GB)

(73) Assignee: Nokia Technologies Oy, Espoo (FI)

( * ) Notice: Subject to any disclaimer, the term of this patent is extended or adjusted under 35 U.S.C. 154(b) by 208 days.

(21) Appl. No.: 17/351,851

(22) Filed: Jun. 18, 2021

(65) Prior Publication Data

US 2022/0004633 A1 Jan. 6, 2022

(30) Foreign Application Priority Data

Jul. 1, 2020 (EP) ..................... 20183451

(51) Int. Cl.
| | |
|---|---|
| *G06F 21/00* | (2013.01) |
| *G06F 11/30* | (2006.01) |
| *G06F 11/34* | (2006.01) |
| *G06F 21/56* | (2013.01) |

(52) U.S. Cl.
CPC ........ *G06F 21/567* (2013.01); *G06F 11/3062* (2013.01); *G06F 11/3495* (2013.01); *G06F 21/562* (2013.01); *G06F 2221/034* (2013.01)

(58) Field of Classification Search
CPC .............. G06F 21/567; G06F 11/3062; G06F 11/3495; G06F 21/562; G06F 2221/034; G06F 1/28; G06F 21/566; G06F 21/554
See application file for complete search history.

(56) References Cited

U.S. PATENT DOCUMENTS

| | | | | |
|---|---|---|---|---|
| 10,505,393 | B2 * | 12/2019 | Liu | .................. B60L 53/12 |
| 2010/0313270 | A1 * | 12/2010 | Kim | ................ H04W 52/0264 |
| | | | | 726/24 |
| 2012/0180126 | A1 * | 7/2012 | Liu | ..................... G06F 21/81 |
| | | | | 726/22 |
| 2012/0210138 | A1 | 8/2012 | Tucker | |
| 2013/0117850 | A1 * | 5/2013 | Britton | ................. G06F 21/567 |
| | | | | 726/23 |
| 2013/0179973 | A1 * | 7/2013 | Du | ........................ G06F 1/28 |
| | | | | 713/340 |

(Continued)

FOREIGN PATENT DOCUMENTS

| | | | | |
|---|---|---|---|---|
| WO | WO-2013069587 | A1 * | 5/2013 | ............ G06F 21/57 |
| WO | 2014/202831 | A1 | 12/2014 | |
| WO | 2015/145425 | A1 | 10/2015 | |

OTHER PUBLICATIONS

Das et al., "Semantics-Based Online Malware Detection: Towards Efficient Real-Time Protection Against Malware", IEEE Transactions on Information Forensics and Security, vol. 11, No. 2, Feb. 2016.*

(Continued)

*Primary Examiner* — Morshed Mehedi
(74) *Attorney, Agent, or Firm* — Harrington & Smith (57) ABSTRACT

Examples of the disclosure can provide an apparatus for detecting malware. The apparatus can comprise means for: selecting one or more tasks to be performed by a user device during charging of the user device; enabling a power trace to be obtained wherein the power trace provides an indication of the power consumed by the user device while the one or more tasks are being performed; and enabling the power trace to be analysed to provide an indication of the presence of malware.

18 Claims, 3 Drawing Sheets

(56) References Cited

U.S. PATENT DOCUMENTS

| | | | | |
|---|---|---|---|---|
| 2014/0202831 | A1* | 7/2014 | Varhaniovsky | B65G 37/00 198/465.2 |
| 2015/0143456 | A1* | 5/2015 | Raleigh | H04L 63/20 726/1 |
| 2016/0134152 | A1* | 5/2016 | Tuli | H02J 7/04 320/108 |
| 2016/0252949 | A1* | 9/2016 | Virolainen | G06F 11/3062 713/323 |
| 2017/0017295 | A1* | 1/2017 | McPherson | G06F 11/3414 |
| 2018/0007074 | A1* | 1/2018 | Kune | H04Q 9/00 |
| 2018/0011130 | A1 | 1/2018 | Aguayo Gonzalez et al. | |
| 2018/0173877 | A1* | 6/2018 | Guri | G06F 1/28 |
| 2018/0314860 | A1* | 11/2018 | Kose | H04L 9/0662 |
| 2018/0330091 | A1* | 11/2018 | Prowell | G06F 21/552 |
| 2021/0216632 | A1* | 7/2021 | Bean | G06F 21/566 |

OTHER PUBLICATIONS

"New Malware Detector Identifies Bugs By Monitoring Power Usage", UT News, Retrieved on Jun. 15, 2021, Webpage available at: https://news.utexas.edu/2019/05/08/new-malware-detector-identifies-bugs-by-monitoring-power-usage/.

Yang et al., "Power Consumption Based Android Malware Detection", Journal of Electrical and Computer Engineering, vol. 2016, Article ID 6860217, Apr. 2016, pp. 1-6.

"Your Phone's Power Use Can Give Hackers an Opening", Newswise, Retrieved on Jun. 15, 2021, Webpage available at: https://www.newswise.com/articles/your-phone-s-power-use-can-give-hackers-an-opening.

"The Huawei Mate 20 Pro can Wirelessly Charge Other Devices", The Verge, Retrieved on Jun. 15, 2021, Webpage available at: https://www.theverge.com/circuitbreaker/2018/10/16/17967012/huawei-mate-20-pro-reverse-wireless-charging-smartphone.

"Belkin Partners with Devialet for a Google Assistant Smart Speaker that's also a Wireless Charger", The Verge, Retrieved on Jun. 15, 2021, Webpage available at: https://www.theverge.com/2020/1/6/21048489/belkin-devialet-soundform-elite-smart-speaker-wireless-charger-google-assistant-price-ces-2020.

"The Future Of Wireless Charging", The Forbes, Retrieved on Jun. 15, 2021, Webpage available at: https://www.forbes.com/sites/rrapier/2020/04/19/the-future-of-wireless-charging/#7a7581f13096.

"Mobile Malware Attacks are Booming in 2019: These are the Most Common Threats", ZDNet, Retrieved on Jun. 15, 2021, Webpage available at: https://www.zdnet.com/article/mobile-malware-attacks-are-booming-in-2019-these-are-the-most-common-threats/.

"Five Tips to Protect Mobile Banking Against Malware", Wultra Blog, Medium, Retrieved on Jun. 15, 2021, Webpage available at: https://medium.com/wultra-blog/five-steps-to-protect-mobile-banking-against-malware-cefcc3cfedfc.

Kim et al., "Detecting Energy-greedy Anomalies and Mobile Malware Variants", Proceedings of the 6th international conference on Mobile systems, applications, and services, Jun. 2008, pp. 239-252.

Bridges et al., "Towards Malware Detection via CPU Power Consumption: Data Collection Design and Analytics", 17th IEEE International Conference On Trust, Security And Privacy In Computing And Communications/ 12th IEEE International Conference On Big Data Science And Engineering (TrustCom/BigDataSE), Aug. 1-3, 2018, pp. 1-5.

Extended European Search Report received for corresponding European Patent Application No. 20183451.2, dated Nov. 20, 2020, 9 pages.

Liu et al., "VirusMeter: Preventing Your Cellphone from Spies", International Workshop on Recent Advances in Intrusion Detection, 2009, pp. 244-264.

Qadri et al., "A Review of Significance of Energy-Consumption Anomaly in Malware Detection in Mobile Devices", International Journal on Cyber Situational Awareness, vol. 1, No. 1, 2016, pp. 1-21.

* cited by examiner

APPARATUS, METHOD AND COMPUTER PROGRAM FOR DETECTING MALWARE

TECHNOLOGICAL FIELD

Examples of the present disclosure relate to an apparatus, method and computer program for detecting malware. Some relate to an apparatus, method and computer program for detecting malware while a user device is being charged.

BACKGROUND

Malware attacks can be very problematic for users of wireless devices such as mobile phones and other communication devices. Malware can be used to attack such devices and obtain secure information such as a user's payment details or for surveillance of the user or for other disruptive purposes.

It is desirable to be able to protect such devices from malware attacks.

BRIEF SUMMARY

According to various, but not necessarily all, examples of the disclosure there is provided an apparatus comprising means for: selecting one or more tasks to be performed by a user device during charging of the user device; enabling a power trace to be obtained wherein the power trace provides an indication of the power consumed by the user device while the one or more tasks are being performed; and enabling the power trace to be analysed to provide an indication of the presence of malware.

The power trace may be obtained from power monitoring circuitry of a charging device configured to charge the user device.

The one or more tasks may be performed during inductive charging of the user device.

The power trace may be obtained from power monitoring circuitry of an inductive charging device configured to charge the user device.

Analysing the power trace may comprise comparing the obtained power trace to stored power trace data.

The stored power trace data may be obtained from a plurality of other user devices.

The power trace data may be compared to power traces of user devices performing the one or more tasks without the presence of malware.

The one or more tasks that are performed by the user device may comprise one or more tasks that produce a respective output that can be detected by another device.

The one or more tasks that are performed by the user device may comprise one or more of; completing a transaction, uploading data, activating a display, activating an audio output device.

The one or more tasks to be performed by the user device may be selected based on one or more of past use of the user device, predicted use of the user device, predicted charging time for the user device, vulnerability of applications, current charging state of the user device.

According to various, but not necessarily all, examples of the disclosure there is provided an apparatus comprising at least one processor; and at least one memory including computer program code, the at least one memory and the computer program code configured to, with the at least one processor, cause the apparatus at least to perform: selecting one or more tasks to be performed by a user device during charging of the user device; enabling a power trace to be obtained wherein the power trace provides an indication of the power consumed by the user device while the one or more tasks are being performed; and enabling the power trace to be analysed to provide an indication of the presence of malware.

According to various, but not necessarily all, examples of the disclosure there is provided a user device comprising an apparatus as described above.

According to various, but not necessarily all, examples of the disclosure there is provided a charging device comprising an apparatus as described above.

According to various, but not necessarily all, examples of the disclosure there is provided a method comprising: selecting one or more tasks to be performed by a user device during charging of the user device; enabling a power trace to be obtained wherein the power trace provides an indication of the power consumed by the user device while the one or more tasks are being performed; and enabling the power trace to be analysed to provide an indication of the presence of malware.

In some examples of the method the one or more tasks are performed during inductive charging of the user device.

According to various, but not necessarily all, examples of the disclosure there is provided a computer program comprising computer program instructions that, when executed by processing circuitry, cause: selecting one or more tasks to be performed by a user device during charging of the user device; enabling a power trace to be obtained wherein the power trace provides an indication of the power consumed by the user device while the one or more tasks are being performed; and enabling the power trace to be analysed to provide an indication of the presence of malware.

BRIEF DESCRIPTION

Some examples will now be described with reference to the accompanying drawings in which.

DETAILED DESCRIPTION

Examples of the disclosure relate to apparatus 101 that can be configured to detect malware in a user device 301. This is achieved by monitoring power usage as the user device 301 performs one or more tasks during charging.

Figure 1:
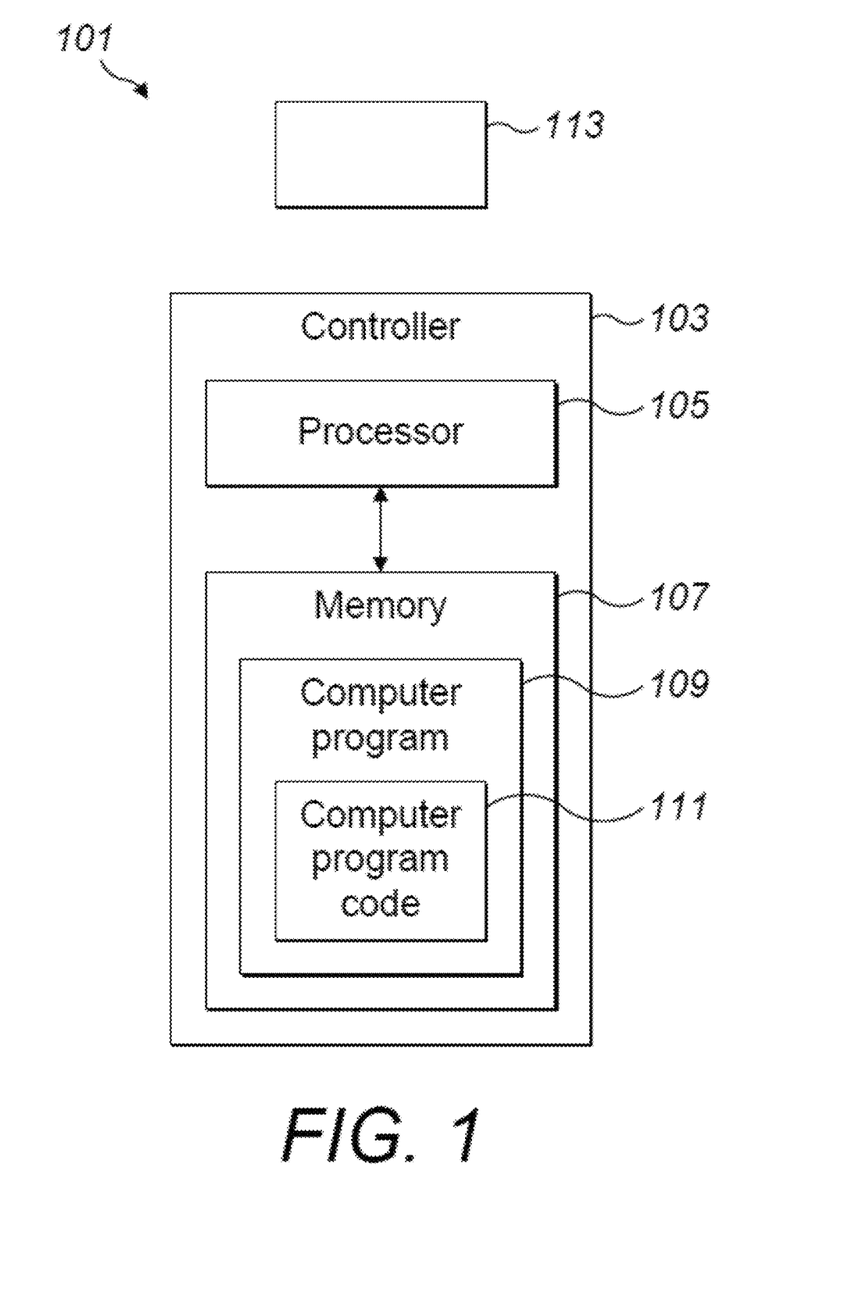
FIG. 1 shows an example apparatus.

FIG. 1 schematically illustrates an apparatus 101 according to examples of the disclosure. The apparatus 101 illustrated in FIG. 1 may be a chip or a chip-set. In some examples the apparatus 101 may be provided within user devices 301 such as mobile phones or other communication devices. In some examples the apparatus 101 may be provided within a charging device 305 that can be used to charge the user device 301. In some examples the apparatus 101 could be provided in another device such as a server or processing device that is separate to either the user device 301 or the charging device 305.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIG. 2. The processor 105 by reading the memory 107 is able to load and execute the computer program 109.

Figure 2:
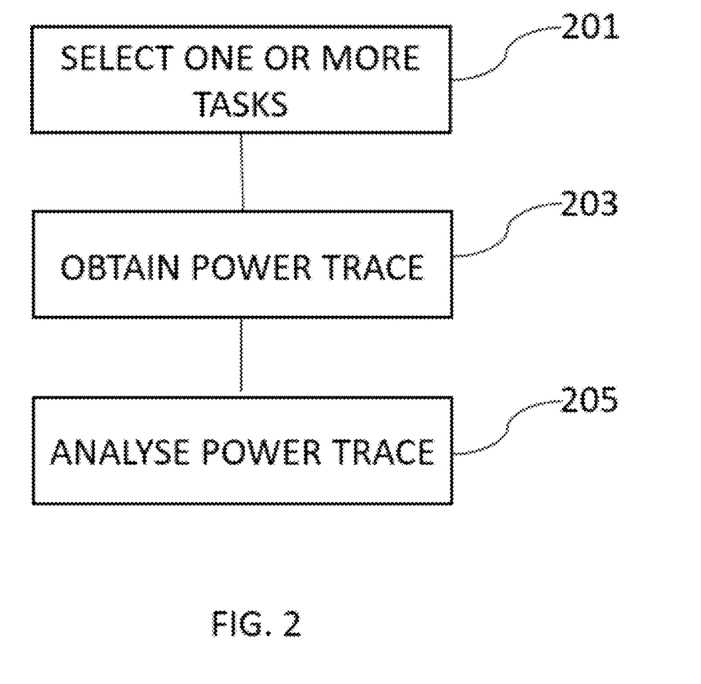
FIG. 2 shows an example method.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: selecting 201 one or more tasks to be performed by a user device 301 during charging of the user device 301; enabling 203 a power trace 401 to be obtained wherein the power trace 401 provides an indication of the power consumed by the user device 301 while the one or more tasks are being performed; and enabling 205 the power trace 401 to be analysed to provide an indication of the presence of malware.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IPv6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: selecting 201 one or more tasks to be performed by a user device 301; enabling 203 a power trace 401 to be obtained wherein the power trace 401 provides an indication of the power consumed by the user device while the one or more tasks are being performed; and enabling 205 the power trace 401 to be analysed to provide an indication of the presence of malware.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 2 can represent steps in a method and/or sections of code in the computer program 109. The illustration of a particular order to the blocks does not necessarily imply that there is a required or preferred order for the blocks and the order and arrangement of the block may be varied. Furthermore, it can be possible for some blocks to be omitted.

FIG. 2 shows an example method that can be implemented by an apparatus 101 as shown in FIG. 1.

The method comprises, at block 201, selecting one or more tasks to be performed by a user device 301 during charging of the user device 301.

Figure 3:
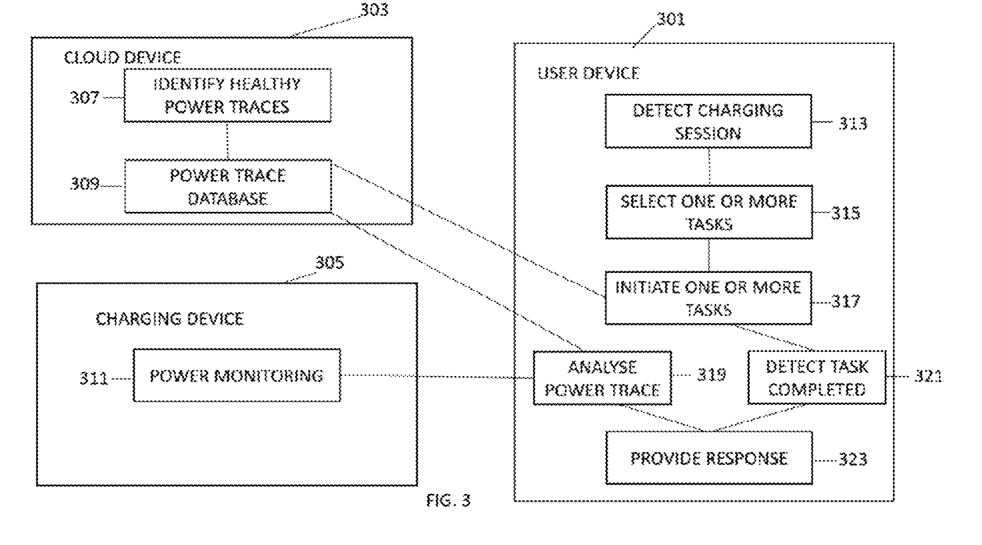
FIG. 3 shows an example system.

The one or more tasks can be performed during inductive charging of the user device 301. In order to enable inductive charging of the user device 301 the user device 301 can be positioned in proximity to a charging device 305 so that one or more inductive coils in the charging device 305 can transfer power wirelessly to the user device 301.

In other examples the charging could be performed through one or more wires or cables. In some examples the charging could be performed though wires that also allow for the transfer of data between the user device 301 and a charging device 305.

The one or more tasks that are selected to be performed by the user device 301 comprise one or more tasks that produce a respective output that can be detected by another device. The another device could be the charging device 305, another device that is separate to both the user device 301 and the charging device 305, a device comprising one or more sensors that can detect the respective output produced by the user device 301 or any other suitable device.

In some examples the one or more tasks that are selected to be performed can comprise completing a transaction. For example, a transaction of zero or very low value can be performed to enable a payment application to be scanned for malware. Another device can be used to determined that the transaction has been completed.

In some examples the one or more tasks that are selected comprise uploading data. The data could be uploaded to another device that can then confirm that the data has been uploaded successfully. The data that is uploaded could comprise a sample of data that is superficially provided to the user device 301 for use during a check for malware or data that is stored in the user device 301 or any other suitable type of data.

In some examples the one or more tasks that are selected could comprise activating a display. The user device 301 can be configured to display an image or other data on a display of the user device 301. The display of the image could be detected by another device comprising one or more image sensors. In some examples the one or more tasks that are selected could comprise controlling a light source, such as a dedicated LED light source of the user device 301, or the display. The user device 301 can be configured to control one or more parameters of the emitted light from the light source, such as the intensity (brightness), frequency (colour) or a temporal sequence of the emitted light. The one or more parameters of the controlled emitted light could be detected by another device comprising one or more light sensors.

In some examples the one or more tasks that are selected could comprise activating an audio output device. For example, the loudspeakers of the user device 301 could be configured to provide an audible output that could be detected by a smart speaker device or any other suitable device comprising one or more microphones or other audio sensors.

It is to be appreciated that other tasks or functions could be performed in other examples of the disclosure.

The one or more tasks to be performed by the user device 301 can be selected so as to improve the security of the user device 301 and reduce the risk of malware being able to disrupt the user device 301 or obtain secure information from the user device 301. In order to achieve this the selected one or more tasks to be performed by the user device 301 can be tasks that relate to applications or functions that provide a higher risk, for example applications and functions that store or use more sensitive information.

In some examples the one or more tasks can be selected based on past use of the user device 301. For instance, the past use of the user device 301 can indicate which applications or functions of the user device 301 that are used a lot or which applications or functions have been used since the user device 301 was last checked for malware. These could be considered to be at risk of having been infected with malware and so tasks related to the applications or functions that have been used recently could be selected to be checked for malware.

In some examples the one or more tasks can be selected based on predicted use of the user device 301. For example, it can be predicted that a user could be likely to use one or more applications before the next charging of the user device 301 and/or before the next opportunity to scan the user device 301 for malware. For example a user could use a payment app to pay for transport on their commute to and from work and so it can be predicted when this app is likely to be used. In such cases the tasks that are selected could relate to the applications or functions that are predicted to be used.

In some examples the one or more tasks can be selected based on a predicted charging time of the user device 301. The tasks that are selected could be any tasks that can be completed within the length of time that it is predicted the charging will last for so that when the user starts to use the user device 301 again the tasks and the malware check are completed. This could result in different tasks being selected when the user device 301 is charging overnight for several hours compared to when the user device 301 is being charged during the day for example.

In some examples the current charging state of the user device 301 could also be used to select the one or more tasks. This could help to determine the predicted charging time of the user device 301. In some examples it could be used to select one or more tasks that the user device has sufficient power to perform.

In some examples the one or more tasks can be selected based on the vulnerability of the applications on the user device 301. For instance applications that use or have access to personal information or payment information could be checked more regularly than applications that don't contain such vulnerable information. For example a banking application or application that has a user's payment details stored in them could be considered a high priority and checked for malware with a higher frequency than an application such as an image processing or editing application which doesn't contain any confidential information.

It is to be appreciated that in some implementations combinations of the above mentioned criteria, or any other additional criteria, could be used to select the one or more tasks to be performed.

The one or more tasks to be performed can be initiated by any suitable trigger event. In some examples a user of the user device 301 can configure the user device 301 to perform the check for malware at defined intervals or in response to a specific user input. In some examples the tasks can be initiated whenever the user device 301 is charged. In some examples the tasks can be initiated whenever it is determined that certain criteria have been fulfilled. The criteria could comprise a length of time since the last check for malware, the use of one or more specific applications or any other suitable criteria.

Figure 4:
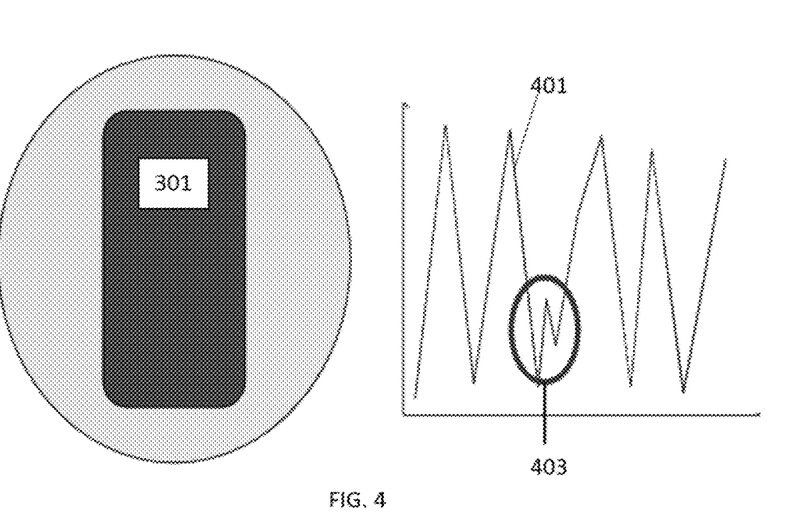
FIG. 4 shows an example implementation of the disclosure.

At block 203 the method comprises enabling 203 a power trace 401 to be obtained. The power trace 401 provides an indication of the power consumed by the user device 301 while the one or more tasks are being performed.

In some examples the power trace 401 can be obtained from power monitoring circuitry of the charging device 305 configured to charge the user device 301. In some examples the charging device 305 can enable inductive charging of the user device 301. This can enable the power trace 401 to be obtained independently of the user device 301 so that the user device 301 does not need to self-report the power usage. This helps to protect the user device 301 from malware that could corrupt the self-reporting of the power trace.

At block 205 the method comprises enabling the power trace 401 to be analysed to provide an indication of the presence of malware.

The analysis of the power trace comprises comparing the obtained power trace data to stored power trace data. The stored power trace data can be obtained from a plurality of other user devices. The stored power trace data can be obtained from a plurality of user devices that perform the one or more selected tasks without the presence of malware. This can then enable the obtained power trace to be compared with power trace data that would be expected for the user device 301 operating without malware.

The stored power trace data could comprise data that is obtained from user devices having different battery ages and battery charge levels so as to enable this to be taken into account when performing the analysis.

The obtained power trace 401 can be compared to the stored power trace data using correlations, pattern recognition or any other suitable process.

If the analysis shows a good match or correlation between the obtained power trace and the stored power trace data indicative of a healthy user device then no further action is needed. In some examples an alert can be provided to the user of the user device 301 that the check has been carried out and no malware was detected.

If the analysis does not show a good match or correlation between the obtained power trace and the stored power trace data indicative of a healthy user device then this indicates that it is possible that malware is present within the user device 301. In some examples a further check for malware could be performed to enable the issues to be diagnosed more specifically. In some examples an alert can be provide to a user of the user device 301 that malware has been detected.

The criteria for determining whether of not a good match or correlation is shown could comprise determining whether a difference in the obtained power trace and the stored power trace is within a threshold. The threshold could be set as a number of standard deviations from a known good power trace. in some examples the classification of an obtained power trace as a good power trace or otherwise could be performed using a neural network system that can be trained to provide the desired detector characteristics without any specific statistical rules.

FIG. 3 illustrates an example system for implementing examples of the disclosure. The system comprises a user device 301, a cloud device 303 and a charging device 305. It is to be appreciated that the system could comprise additional components in other examples of the disclosure.

The user device 301 could comprise a mobile telephone or any other suitable type of user device, for example a lap top, a wearable device such as a watch or heart monitor or a device that forms part of an internet of things. The user device 301 could comprise an apparatus 101 as shown in FIG. 1 that is configured to perform a method as shown in FIG. 2. In other examples the apparatus 101 for performing the method of FIG. 2 could be provided in the cloud device 303 or in the charging device 305. In some examples the method could be performed by different devices within the system so that the user device 301 could perform some of the method while the cloud device 303 and/or the charging device 305 could perform other parts of the method.

In the example shown in FIG. 3 the user device 301 comprises a charging session detection module 313. The charging session detection module 313 is configured to detect the initiation of charging by the charging device 305. The charging can be inductive charging or any other suitable type of charging. Where the charging is inductive charging the charging session detection module 313 can be configured to detect that the user device 301 is positioned in proximity to a charging device 305 so as to enable power transfer to the user device 301.

The user device 301 also comprises a task selection module 315 that is configured to select one or more tasks to be performed by the user device 301 during the charging session. The tasks could be selected based on one or more of past use of the user device 301, predicted use of the user device 301, predicted charging time for the user device 301, vulnerability of applications, current charging state of the user device 301 or any other suitable criteria or combinations of criteria.

In some examples the task selection module 315 can be configured to receive an input from the charging session detection module 313 so that the tasks are selected in response to the detection of a charging session being initiated.

The user device 301 also comprises a task initiation module 317 configured to initiate the one or more selected tasks. The task initiation module 317 can be configured to receive an input from the task selection module 315 and use that input as a trigger to initiate the tasks. This can enable the tasks to be initiated automatically, without any user input, when the charging session is detected. In some examples the task initiation module 317 can be configured to initiate the tasks in response to a user input or any other suitable trigger event.

The selected tasks initiated by the task initiation module 317 can use one or more applications of the user device 301. The tasks that are initiated could comprise completing a transaction, uploading data, activating a display, activating an audio output device or any other suitable tasks or combinations of tasks.

In the example shown in FIG. 3 the user device 301 also comprises a detect completed task module 321 that is configured to detect that the tasks initiated by the task initiation module 317 have been completed. For example, the detect completed task module 321 can determine when the selected tasks have been successfully completed. In some examples the detect completed task module 321 can determine that a task has been completed by receiving a notification from another device. In such examples the another device could detect that a transaction has been performed or that data has been uploaded and could provide an indication of this to the user device 301. The another device that provides the notification could be part of the system, for example it could be the charging device 305 or the cloud device 303 or it could be any other suitable device. In some examples the detect completed task module 321 can detect itself that a task has been completed without any other inputs from any other devices.

The user device 301 shown in FIG. 3 also comprises a power trace analysis module 319. The power trace analysis module 319 is configured to compare the power trace data obtained from the user device 301 while the one or more tasks are being performed with power trace data obtained from other user devices. The power trace data obtained from other user devices can be other similar user devices 301 that have performed the same or similar tasks without the presence of malware while being charged by a similar charging device 305. The analysis can comprise pattern recognition, correlations or any other similar processes.

In the example shown in FIG. 3 the power trace analysis module 319 is provided within the user device 301 so that the user device 301 obtains power trace data from the cloud device 303. In other examples the power trace data could be stored in a memory of the user device 301. In other examples the power trace analysis module 319 could be provided in a cloud device 303 so that the analysis of the power trace is performed externally to the user device 301. In such examples an output indicative of the power trace analysis can be provided to the user device 301.

The user device 301 also comprises a response module 323. The response module 323 is configured to provide a response dependent upon the analysis of the power trace data. In some examples the response could be an alert that is provided to the user indicative of the outcome of the analysis of the power trace data. For instance, it could provide an indication that a check for malware has been performed and provide an indication as to whether or not there is suspected to be any malware within the user device 301.

The system shown in FIG. 3 also comprises a cloud device 303. The cloud device 303 can comprise a device that is external to both the user device 301 and the charging device 305. The cloud device 303 could be configured to communicate with the user device 301 and/or the charging device 305 as needed. The cloud device 303 can be configured to communicate with the user device 301 and the charging device 305 via any suitable wireless protocol. In some examples the cloud device 303 could be a server or other processing device that can be located remotely to both the user device 301 and the charging device 305.

In the examples shown in FIG. 3 the cloud device 303 comprises an identification of healthy traces module 307. The identification of healthy traces module 307 can be configured to obtain power traces from a plurality of other user devices 301. The identification of healthy traces module 307 can determine which of these traces can be classified as healthy traces that correspond to user devices 301 that are operating without malware. Any suitable process can be used to identify the healthy traces, for example machine learning, pattern recognition or any suitable process or combination of processes. In some examples healthy power traces can be defined by the majority common signature during the Interrogation task, in scenarios where this matches with initial signatures captured before exposure to malware risk.

The cloud device 303 comprises a power trace database 309. The power trace database 309 comprises the healthy traces that are identified by the identification of healthy traces module 307. The healthy traces that are stored in the power trace database 309 could be categorised in terms of type of user device 301, types of tasks that are performed, age of the user device 301 and/or any other suitable categories.

The power trace database 309 is configured to be accessible by the user device 301 so that the power trace data for the user device 301 can be compared with the power traces for the healthy devices.

The charging device 305 can comprise any device that is configured to transfer power to the user device 301. The charging device 305 can comprise charging circuitry that enables inductive charging of the user device 301 or any other suitable type of charging.

The charging device 305 also comprises a power monitoring module 311. The power monitoring module 311 comprises any means that can be configured to monitor the power transferred to the user device 301 during charging and obtain a power trace indicative of this power. The power monitoring module 311 can be used to determine how efficiently power is being transferred to the user device 301. In this example the power monitoring module 311 can also determine the power being used by the user device 301 as the one or more tasks are being performed.

The power monitoring module 311 can use any suitable means to determine the power being consumed by the user device 301 while the tasks are being performed. In some examples the charging device 305 can comprise charging coils that can be used by the power monitoring module 311 to determine the power consumed by the user device 301.

In some examples the charging device 305 can comprise a plurality of charging coils and only one or some of these are actively used to charge the user device 305 at a given time. In such examples the charging coil or coils that are not currently in use for charging the user device 301 could be used to detect a magnetic field generated by the user device 301 when the tasks are being performed. The information relating to the magnetic field can be used in addition or alternatively to the power trace data to determine that the tasks have been completed. In some examples, variations in the electromagnetic field detected by the charging coils of the charging device can be used, in addition to variations in the power trace, to provide an indication of the presence of malware on the user device 301. The charging device 305 may comprise means for filtering the operating frequency of the ongoing charging protocol from a detected electromagnetic field signal (e.g. 80 kHz to 300 Hz frequency range for medium power charging under the Qi® Wireless Charging standard). The filtering is performed in order to extract information form the detected electromagnetic signal e.g. that the one or more tasks have been completed and/or the variations in the electromagnetic field, as described above.

The charging device 305 is configured so that the power trace data obtained by the power monitoring module 311 can be provided to the user device 301 to enable analysis of the power trace data by the power trace analysis module 319.

FIG. 4 shows an example implementation of the disclosure. The implementation comprises a user device 301 such as a mobile phone or any other suitable type of device. The user device 301 can comprise an apparatus 101 as shown in FIG. 1.

The user device can be configured to perform one or more selected tasks during a charging session so as to enable a power trace 401 to be obtained. The power trace 401 provides an indication of the power provided to the user device 301 as a function of time. The power trace 401 can then be analysed to look for irregularities 403 or differences compared to power traces obtained from healthy devices to provide an indication of whether there is any malware present within the user device.

Therefore examples of the disclosure provide apparatus 101 and methods that enable a user device 301 to be scanned for malware during a charging session. This provides a convenient way to protect the user device 301 from malware attacks.

In some examples the systems, apparatus 101, methods and computer programs can use machine learning which can include statistical learning. For example, machine learning could be used by the cloud device 303 to identify the healthy power traces or could be used by the user device 301 to compare an obtained power trace to the healthy power traces. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising: at least one processor; and at least one non-transitory memory storing instructions that when executed by the at least one processor, cause the apparatus to:
   select one or more tasks determined to be performed by a user device before a next charging of the user device, wherein the one or more tasks to be performed by the user device are selected at least based on a predicted use of applications on the user device as determined based on a past use of applications on the user device since the user device was last checked for malware;
   enable a power trace to be obtained wherein the power trace provides an indication of the power consumed by the user device while the one or more tasks are being performed; and
   enable the power trace to be analysed to provide an indication of the presence of malware,
   wherein analysing the power trace comprises comparing the obtained power trace to stored power trace data obtained from a plurality of other user devices.

2. The apparatus as claimed in claim 1 wherein the power trace is obtained from power monitoring circuitry of a charging device configured to charge the user device.

3. The apparatus as claimed in claim 1 wherein the one or more tasks are performed during inductive charging of the user device.

4. The apparatus as claimed in claim 3 wherein the power trace is obtained from power monitoring circuitry of an inductive charging device configured to charge the user device.

5. The apparatus as claimed in claim 1, wherein the power trace data is compared to power traces of user devices performing the one or more tasks without the presence of malware.

6. The apparatus as claimed in claim 1 wherein the one or more tasks to be performed by the user device comprise one or more tasks that produce a respective output detectable by another device.

7. The apparatus as claimed in claim 1 wherein the one or more tasks to be performed by the user device comprise one or more of; completing a transaction, uploading data, activating a display, activating an audio output device.

8. The apparatus as claimed in claim 1 wherein the one or more tasks to be performed by the user device are selected based on a further one or more of a predicted charging time for the user device, vulnerability of applications, or a current charging state of the user device.

9. A charging device comprising an apparatus as claimed in claim 1.

10. A method comprising:
    selecting one or more tasks determined to be performed by a user device during before a next charging of the user device,
    wherein the one or more tasks to be performed by the user device are selected at least based on a predicted use of applications on the user device as determined based on a past use of applications on the user device since the user device was last checked for malware;
    enabling a power trace to be obtained wherein the power trace provides an indication of the power consumed by the user device while the one or more tasks are being performed; and
    enabling the power trace to be analysed to provide an indication of the presence of malware,
    wherein analysing the power trace comprises comparing the obtained power trace to stored power trace data obtained from a plurality of other user devices.

11. The method as claimed in claim 10 wherein the one or more tasks are performed during inductive charging of the user device.

12. The method as claimed in claim 10 wherein the power trace is obtained from power monitoring circuitry of a charging device configured to charge the user device.

13. The method as claimed in claim 10 wherein the one or more tasks to be performed by the user device comprise one or more tasks that produce a respective output that can be detectable by another device.

14. The method as claimed in claim 10 wherein the one or more tasks to be performed by the user device comprise one or more of: completing a transaction, uploading data, activating a display, activating an audio output device.

15. A non-transitory computer readable medium comprising program instructions stored thereon for performing at least the following:
    selecting one or more tasks to be performed by a user device during charging of the user device,
    wherein the one or more tasks to be performed by the user device are selected at least based on a predicted use of applications on the user device as determined based on a past use of applications on the user device since the user device was last checked for malware;
    enabling a power trace to be obtained wherein the power trace provides an indication of the power consumed by the user device while the one or more tasks are being performed; and
    enabling the power trace to be analysed to provide an indication of the presence of malware,
    wherein analysing the power trace comprises comparing the obtained power trace to stored power trace data obtained from a plurality of other user devices.

16. The non-transitory computer readable medium of claim 15 wherein the one or more tasks to be performed by the user device comprise one or more tasks that produce a respective output detectable by another device.

17. The non-transitory computer readable medium of claim 15 wherein the one or more tasks to be performed by the user device comprise one or more of:
    completing a transaction, uploading data, activating a display, activating an audio output device.

18. The non-transitory computer readable medium of claim 15 wherein the one or more tasks to be performed by the user device are selected based on one or more of a predicted charging time for the user device, vulnerability of applications, or a current charging state of the user device.

* * * * *